Oct. 4, 1938.  L. GOLDHAMMER  2,132,157
ROLL FILM CAMERA
Filed Jan. 12, 1935
Fig. 1
Fig. 2
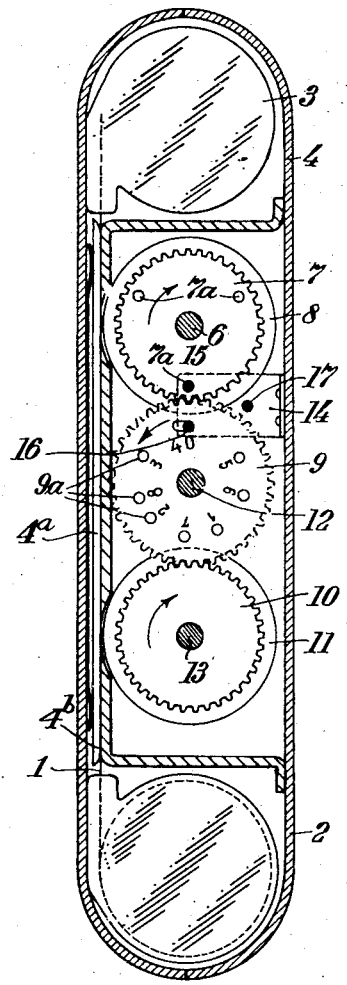
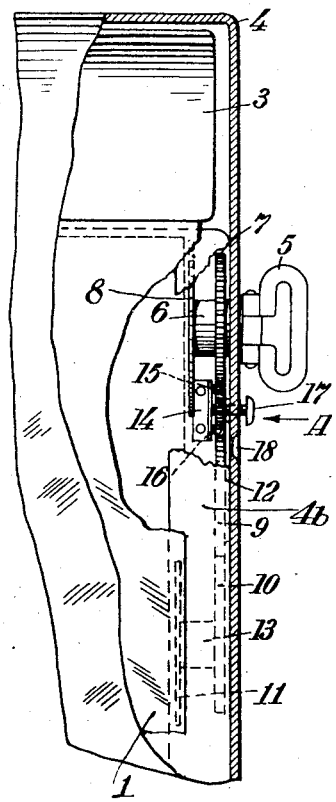
Inventor
Leo Goldhammer
By Attorney Patented Oct. 4, 1938

2,132,157

UNITED STATES PATENT OFFICE 2,132,157

ROLL FILM CAMERA

Leo Goldhammer, Munich, Germany, assignor to Agfa Ansco Corporation, Binghamton, N. Y., a corporation of New York Application January 12, 1935, Serial No. 1,471
In Germany December 8, 1933

7 Claims. (Cl. 95—31)

My present invention relates to a roll film camera and more particularly to a roll film camera with a device for advancing roll film which has no protective paper.

One of its objects is a roll film camera with an improved device for advancing roll film which has no protective paper and which is efficient and permits a saving of film. Further objects will be seen from the detailed specification following hereafter.

Reference is made to the accompanying drawing in which

Fig. 1 shows a side view of a roll film camera according to this invention, the covering plate having been removed, and Fig. 2 shows a partial view from the rear, the rear wall being partly cut away.

The roll film cameras for use with a roll film which has no protective paper are usually provided with a film advancing device by which the perforated or unperforated film is advanced the height of one picture. These cameras involve the drawback that at the beginning or at the end or only at the beginning or only at the end a film strip of the length of one picture projects from the film magazine and is spoiled by unavoidable exposure. This drawback is due to the fact that the length of film advanced by the feed mechanism is always the same and the further fact that the feed mechanism is arranged near the take up magazine or the feed magazine.

In order to avoid this drawback the feed mechanism is constructed in such a manner that the advancing step when advancing that part of the film strip on which the first and the last pictures are taken, is greater than the length of one picture. Therefore, in this manner film can be saved, inasmuch as on a film strip of the same length there can be recorded one additional picture.

According to the invention, the shift movement, the magnitude of which differs in the manner described above is limited by perforated discs in which flexible pins engage. The distribution of holes in the two discs is such that, at the beginning and the end of the picture shift operation the feed device effects a greater shift movement than during the shift movement from picture to picture. After each photograph has been taken, the pins are released by a press button, and the perforated discs and at the same time the feed discs which advance the film are further turned by the film key.

The invention will now be described with reference to the accompanying drawing.

The film 1 runs from the lower box 2 over the picture area into the upper box 3. The film is constantly pressed against the picture gate 4b by means of the pressure plate 4a. The casing of the camera is designated by 4, and the spool key by 5 which engages with the axle 6. On the axle 6 there is mounted a perforated disc 7, the periphery of which is toothed, and a feed disc 8. In order to increase the friction between the film and feed disc to insure that the film 1 shall be carried along by the disc, the periphery of the disc is finely fluted or is coated with a material having good adhesive properties. A second perforated disc 9, the periphery of which is likewise toothed, drives the cogwheel 10 and the conveyer disc 11 which is firmly connected therewith. The perforated disc 9 is rotatably mounted on the axle 12, and the feed disc 11 and the cogwheel 10 are rotatably mounted on the axle 13. On the casing 4 of the housing there is fixed a flat spring 14. This spring carries two pins 15, 16, which, in consequence of the action of the spring tend to engage in the holes of the perforated discs 7, 9 and thus check the forward movement of the film. This checking effect, however, can occur only when two holes of the perforated discs 7, 9 are exactly opposite each other. When the pins engage before the film is further turned, the flat spring 14 is thrust aside by a push button 17 thereby being depressed in the direction indicated by the arrow A in Fig. 2 so that the pins 15, 16 emerge from the holes and release the discs 7 and 9.

Now, in order, for instance, to take eight exposures on a roll film having no protective paper, the following arrangement is proposed for example:—The perforated disc 7 has three symmetrically distributed holes 7a and is made into a cogwheel by the provision of thirty-six teeth on its periphery. This cogwheel meshes with the perforated disc 9 which has forty-one teeth. In the perforated disc 9 the holes 9a are arranged in such a manner that, after each normal shift movement for a film picture one of the holes 9a is exactly opposite one of the three holes 7a, so that to move the film into position for the next picture by means of the film key 5, the perforated disc 7 is turned through 4/3 revolutions. There is an exception when the film is to be brought into position for the first picture and also when the film is moved after the last picture and in these cases the perforated disc 7 is further turned through 5/3 and through 8/3 revolutions respectively before the next hole 9a registers with one of the holes 7a. Further-more, on the perforated disc 9 there are disposed figures which indicate the photographic exposures that have been made. Before the advance movement of a film begins the device must be set at O. The figures can be read from the outside through an aperture 18 in the casing of the camera. The cogwheel 10 has thirty-six teeth and turns therefore with the same velocity as the cogwheel 7 so that the feed discs 8 and 11 advance the film at the same speed.

What I claim is:

1. In a roll film camera for use with films having no protective strips at the ends thereof, in combination a casing, a feed box and a take up box in said casing, means in said casing adjacent said feed box and adjacent said take up box for frictionally gripping said film to advance said film through said casing, said means adjacent said take up box being adapted to grip the end of the film projecting from said feed box and advance it to said means adjacent said take up box, means for operating one of said film advancing means, means intermediate said film advancing means for transmitting power from said one film advancing means to said other film advancing means, and means coacting with said one film advancing means and said intermediate means to stop the advancing means at predetermined points.

2. In a roll film camera, a casing, a feed box and a take-up box on respective opposite sides of the exposure chamber in said casing, a first pressure feed roller adjacent said feed box, a second pressure feed roller adjacent said take-up box, two gears having the same number of teeth, each positively connected to a respective one of said rollers, an idler pinion meshing with each of said two gears and having a number of teeth different from but bearing a predetermined ratio to the number of teeth of said gears, one of said gears and said pinion having circumferentially-spaced perforations, a respective pair of which are in predetermined relation when a film is shifted to proper exposing position, a spring carried by said casing, and two pins on said spring adapted to be projected thereby into said pair of openings when in the position specified.

3. In a roll film camera for use with films having no protective strips at the ends thereof, in combination a casing, a feed box and a take-up box in the opposite ends of said casing, means in said casing separate from but adjacent to said feed box and other means in said casing adjacent to but separate from said take-up box for advancing said film step by step through said casing, said means adjacent said feed box operating to grip the end of the film projecting from said feed box and to advance it to said means adjacent said take-up box, said means adjacent said take-up box operating to grip the end of the film fed thereto and to feed it to said take-up box, and a means for driving said film advancing means.

4. The apparatus as defined in claim 3, including means for stopping said film advancing means at predetermined points.

5. The apparatus as defined in claim 3 including means operable upon the film advancing means adjacent said take-up box for stopping said film advancing means at predetermined points.

6. A device as defined in claim 3 including means intermediate said film advancing means for transmitting power from said one film advancing means to said other film advancing means.

7. The apparatus as defined in claim 3 including means for locking said advancing means against movement after advancing said film by one picture space and means for locking said advancing means against movement after advancing said film by more than one picture space when bringing the film into position for the first picture and when moving the film after the last picture.

LEO GOLDHAMMER.